(12) United States Patent
Mirza

(10) Patent No.: US 12,267,907 B2
(45) Date of Patent: Apr. 1, 2025

(54) USER EQUIPMENT (UE) GROUPING IN A WIRELESS COMMUNICATION NETWORK

(71) Applicant: T-MOBILE INNOVATIONS LLC, Overland Park, KS (US)

(72) Inventor: Mochamad Mirza, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 389 days.

(21) Appl. No.: 17/942,975

(22) Filed: Sep. 12, 2022

(65) Prior Publication Data

US 2024/0098839 A1 Mar. 21, 2024

(51) Int. Cl.
*H04W 76/28* (2018.01)

(52) U.S. Cl.
CPC ................... *H04W 76/28* (2018.02)

(58) Field of Classification Search
CPC ..................................................... H04W 76/28
See application file for complete search history.

(56) References Cited

U.S. PATENT DOCUMENTS

| | | | |
|---|---|---|---|
| 7,610,035 B2 | 10/2009 | Van Bosch et al. | |
| 7,904,023 B2 | 3/2011 | Viitamaki et al. | |
| 9,198,128 B2* | 11/2015 | Kim | H04W 52/0216 |
| 9,232,555 B2 | 1/2016 | Su | |
| 10,021,711 B2* | 7/2018 | Krishnamoorthy | H04W 76/28 |
| 10,225,798 B2* | 3/2019 | Lee | H04W 52/0206 |
| 10,588,171 B2 | 3/2020 | Ang et al. | |
| 10,887,834 B2* | 1/2021 | Ryoo | H04W 52/0216 |
| 10,897,703 B2 | 1/2021 | Jiang et al. | |
| 11,202,259 B2 | 12/2021 | Ji et al. | |
| 11,258,524 B2 | 2/2022 | Gulati et al. | |
| 2020/0259896 A1 | 8/2020 | Sachs et al. | |
| 2020/0413341 A1 | 12/2020 | Xu et al. | |
| 2020/0413475 A1 | 12/2020 | Wei et al. | |
| 2023/0127658 A1* | 4/2023 | Li | H04W 72/23 370/329 |
| 2023/0328841 A1* | 10/2023 | Ganesan | H04L 5/0023 370/330 |
| 2023/0413018 A1* | 12/2023 | Liu | H04W 52/0216 |
| 2024/0064849 A1* | 2/2024 | Mohammad Soleymani | H04W 76/28 |
| 2024/0334539 A1* | 10/2024 | Lee | H04W 76/28 |
| 2024/0365342 A1* | 10/2024 | Ko | H04L 1/1896 |

* cited by examiner

*Primary Examiner* — Harry H Kim

(57) ABSTRACT

A wireless communication network serves Fixed Wireless Access (FWA) User Equipment (UEs) and Mobile Wireless Access (MWA) UEs. Wireless access nodes receive signaling from the UEs and transfer the signaling to a network control-plane. The network control-plane determines network characteristics for the UEs responsive to the signaling. The control-plane generates MWA UE context for the UEs in a MWA UE group based on the network characteristics and generates FWA UE context for the UEs in the FWA UE group based on the network characteristics. The network control-plane transfers signaling to the wireless access nodes having the MWA UE context and the FWA UE context. The wireless access nodes serve the UEs in the MWA UE group by using Discontinuous Reception (DRX) responsive to the MWA UE context. The wireless access nodes serve the UEs in the FWA group without using the DRX responsive to the FWA UE context.

20 Claims, 8 Drawing Sheets

USER EQUIPMENT (UE) GROUPING IN A WIRELESS COMMUNICATION NETWORK

TECHNICAL BACKGROUND

Wireless communication networks provide wireless data services to wireless user devices. Exemplary wireless data services include user data messaging, machine-control, Internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Low-Power Wide Area Network (LP-WAN), and the like. The wireless access nodes exchange network signaling and user data with network elements that are often clustered together into wireless network cores. The wireless network elements comprise Access and Mobility Management Functions (AMFs), Session Management Functions (SMFs), User Plane Functions (UPFs), and the like.

The wireless access nodes and network elements use various network characteristics to serve the wireless user devices like network identifiers, Public Land Mobile Network Identifiers (PLMN IDs), slice information, Quality-of-Service (QoS) identifiers, International Mobile Equipment Identifier Type Allocation Codes (IMEI-TACs), International Mobile Equipment Identifier Software Versions (IMEI-SVs), Service Profile Identifiers (SPIDs), and Radio Frequency Selection Priorities (RFSPs). The network identifiers comprises PLMN IDs, Service Set IDs (SSIDs), network names, and the like. The PLMN IDs comprise country codes and network codes. The slice information comprises slice IDs, slice names, slice descriptors, and the like. The QoS identifiers comprise QoS Class IDs (QCIs), QoS Flow Indicators (QFIs), data rates, latency rates, and the like. The IMEI-TACs describe types of wireless user devices like aerial vehicles and wireless relays. The IMEI-SVs describe types of software in the wireless user devices like operating systems. The SPIDs indicate network account information like data plans and features. The RFSPs enable the wireless access nodes to select appropriate frequency channels for the wireless user devices on a per device basis.

The wireless access nodes and the wireless user devices use Discontinuous Reception (DRX) to conserve battery power in the wireless user devices. With DRX, the wireless access nodes and the wireless user devices agree on a reception schedule for wireless user devices so the devices can sleep longer and save power. The wireless user devices wake per the reception schedule to handle any network tasks like receiving a text message or accepting video call.

The wireless access nodes and the wireless user devices also use pre-emptive scheduling. Pre-emptive scheduling automatically grants time and frequency resources to select wireless user devices. The select wireless user devices wirelessly exchange user data over the automatic grants without having to request the resources. The lack of resource requests decreases latency but wastes some pre-emptively scheduled resource blocks that go unused.

Unfortunately, the use of DRX adds latency to wireless data communications since additional time is required to wake per the reception schedule. Moreover, stopping DRX to improve the data latency drains the device battery. Although the use of preemptive scheduling improves the data latency, unused resources are typically wasted that could be used by other wireless user devices.

TECHNICAL OVERVIEW

A wireless communication network serves Fixed Wireless Access (FWA) User Equipment (UEs) and Mobile Wireless Access (MWA) UEs. Wireless access nodes receive signaling from the UEs and transfer the signaling to a network control-plane. The network control-plane determines network characteristics for the UEs responsive to the signaling. The control-plane generates MWA UE context for the UEs in a MWA UE group based on the network characteristics and generates FWA UE context for the UEs in the FWA UE group based on the network characteristics. The network control-plane transfers signaling to the wireless access nodes having the MWA UE context and the FWA UE context. The wireless access nodes serve the UEs in the MWA UE group by using Discontinuous Reception (DRX) responsive to the MWA UE context. The wireless access nodes serve the UEs in the FWA group without using the DRX responsive to the FWA UE context.

DETAILED DESCRIPTION

Figure 1:
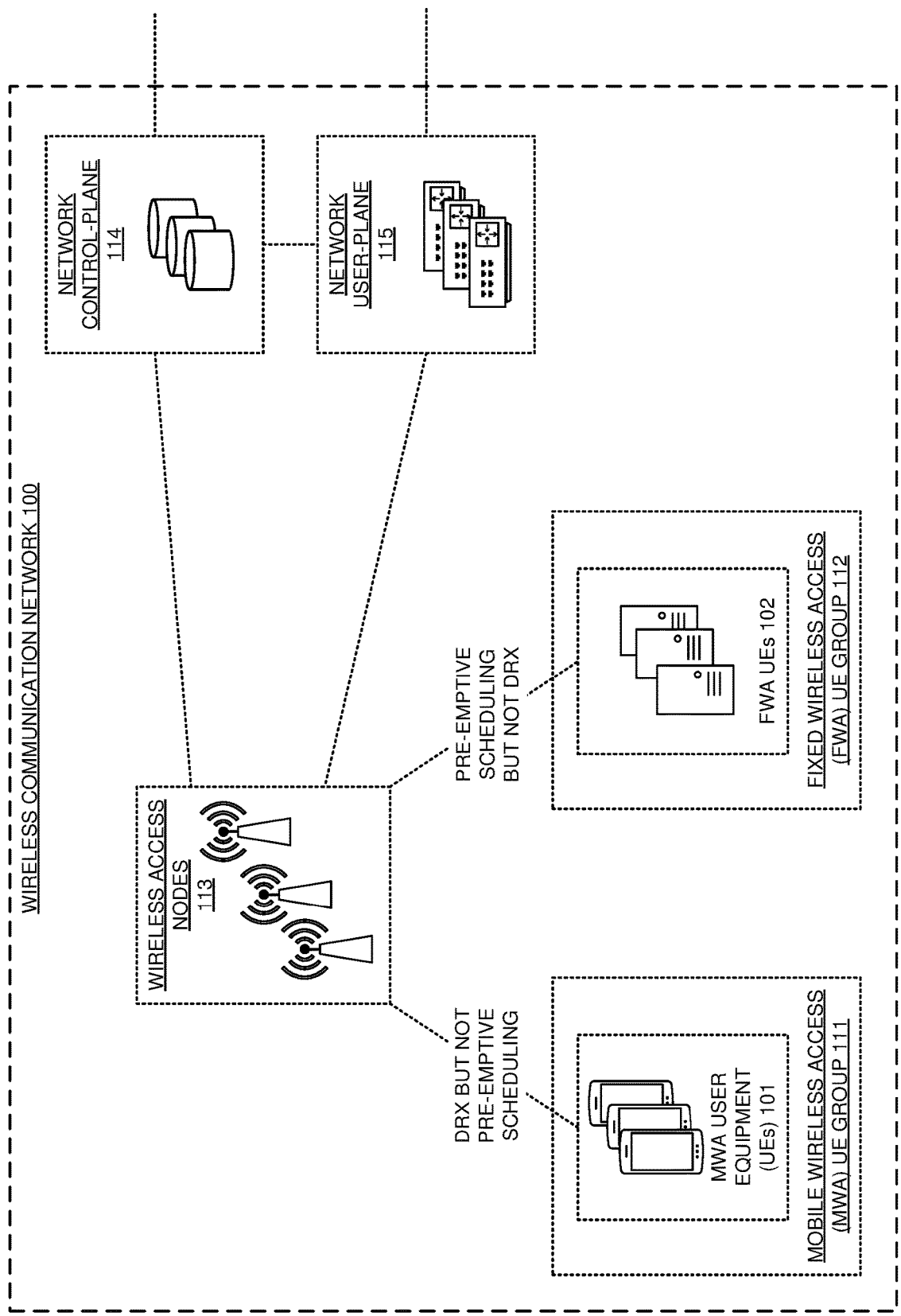
FIG. 1 illustrates an exemplary wireless communication network to serve Mobile Wireless Access (MWA) User Equipment (UEs) in a MWA UE group and to serve Fixed Wireless Access (FWA) UEs in a FWA UE group.

FIG. 1 illustrates exemplary wireless communication network 100 to serve Mobile Wireless Access (MWA) User Equipment (UEs) 101 in MWA UE group 111 and to serve Fixed Wireless Access (FWA) UEs 102 in FWA UE group 112. Wireless communication network 100 comprises UEs 101-102, wireless access nodes 113, network control-plane 114, and network user-plane 115. Wireless communication network 100 delivers wireless data services to UEs 101-102 like internet-access, machine-control, data-collection, content-streaming, media-conferencing, and/or some other wireless data products. MWA UEs 101 move around wireless communication network 100, and wireless access nodes 113 handover MWA UEs 101 to serve their wireless data services. FWA UEs 102 are stationary within wireless communication network 100, and wireless access nodes 113 do not handover FWA UEs 102 to serve their wireless data services.

Wireless access nodes 113 are configured to selectively use Discontinuous Reception (DRX). DRX has network duty-cycle and reception parameters that enable a given UE to sleep longer when idle and conserve battery. The use of DRX increases latency as the longer sleep times will delay the exchange of data. Wireless access nodes 113 are also configured to selectively use pre-emptive scheduling. Pre-emptive scheduling automatically grants time/frequency resource blocks to select UEs. The select UEs wirelessly exchange user data over the automatic grants without having to request the resource blocks. The lack of resource requests decreases data latency but wastes some pre-emptively scheduled resource blocks that go unused.

Wireless access nodes 113 and network planes 114-115 use various network characteristics to serve the UEs 101-102 like network identifiers, Public Land Mobile Network Identifiers (PLMN IDs), slice information, Quality-of-Service (QoS) identifiers, International Mobile Equipment Identifier Type Allocation Codes (IMEI-TACs), International Mobile Equipment Identifier Software Versions (IMEI-SVs), Service Profile Identifiers (SPIDs), and Radio Frequency Selection Priorities (RFSPs). The network identifiers comprises PLMN IDs, Service Set IDs (SSIDs), network names, and the like. The PLMN IDs comprise country codes and network codes. The slice information comprises slice IDs, Network Slice Selection Assistance Information (NSSAI), slice names, slice descriptors, and the like. The QoS identifiers comprise QoS Class IDs (QCIs), QoS Flow Indicators (QFIs), data rates, latency rates, and the like. The IMEI-TACs describe types of UEs like aerial vehicles and wireless relays. The IMEI-SVs describe software in the UEs like operating systems. The SPIDs indicate network account information like data plans and features. The RFSPs enable wireless access nodes 113 to select appropriate frequency channels for UEs 101-102 on a per UE basis.

Various examples of network operation and configuration are described herein. In some examples, MWA UEs 101 wirelessly transfer UE signaling to wireless access nodes 113. Wireless access nodes 113 wirelessly receive the UE signaling from MWA UEs 101 and transfer the UE signaling to network control-plane 114. Network control-plane 114 receives the UE signaling from wireless access nodes 113 for MWA UEs 101. In response, network control-plane determines network characteristics for MWA UEs 101. Exemplary wireless network characteristics comprise network identifiers, PLMN IDs, slice information, QoS identifiers, IMEI-TACs, IMEI-SVs, SPIDs, RFSPs, and/or some other network parameters. Network control-plane 114 generates MWA UE context for MWA UEs 101 in MWA UE group 111 based on the network characteristics. For example, network control-plane 114 may translate a PLMN ID for MWA UE group 111 that was received from MWA UEs 101 into MWA UE context that includes DRX instructions but that does not include preemptive scheduling instructions. Network control-plane 114 transfers network signaling to wireless access nodes 113 to serve MWA UEs 101 in MWA UE group 111 based on the MWA UE context. Wireless access nodes 113 receive the network signaling and wirelessly serve MWA UEs 101 in MWA UE group 111 by using DRX responsive to the MWA UE context in the network signaling. DRX allows MWA UEs 101 to sleep more when idle to conserve battery—but at the cost of increased latency. Moreover, wireless access nodes 113 wirelessly serve MWA UEs 101 in MWA UE group 111 without using pre-emptive scheduling responsive to the MWA UE context in the network signaling. The lack of pre-emptive-scheduling avoids the waste of pre-emptive grants that are never used—at the cost of increased latency.

Contemporaneously, network control-plane 114 generates FWA UE context for FWA UEs 102 in FWA UE group 112 based on the network characteristics. For example, network control-plane 114 may translate a network slice ID for FWA UE group 112 that was received from FWA UEs 102 into FWA UE context that includes preemptive-scheduling instructions but that does not include DRX instructions. Network control-plane 114 transfers network signaling to wireless access nodes 113 to serve FWA UEs 102 in FWA UE group 112 based on the FWA UE context. Wireless access nodes 113 receive the network signaling and wirelessly serve FWA UEs 102 in FWA UE group 112 without using DRX responsive to the FWA UE context in the network signaling. The lack of DRX allows FWA UEs 102 to reduce latency at the cost of battery power when UEs 101 are not charging. Moreover, wireless access nodes 113 wirelessly serve FWA UEs 102 in FWA UE group 112 by using pre-emptive scheduling responsive to the FWA UE context in the network signaling. The pre-emptive scheduling allows FWA UEs 102 to further reduce latency at the cost of some wasted resources when some of these pre-emptive grants are not used.

In some examples, FWA UEs 102 in FWA UE group 112 request DRX—especially if they lose their utility-based power supply and start to consume their back-up battery power. In these examples, wireless access nodes 113 wirelessly receive the DRX requests from some of FWA UEs 102 and wirelessly serve requesting FWA UEs 102 by using DRX responsive to the FWA UE context and the DRX requests.

Advantageously, wireless communication network 100 minimizes the use of DRX and maximizes the use of preemptive scheduling for FWA UEs 102 to improve the speed of their wireless data communications. Moreover, wireless communication network 100 uses DRX for FWA UEs 102 to conserve battery power during power outages when reduced latency is not as critical as battery life.

Wireless UEs 101-102 and wireless access nodes 113 comprise radios that wirelessly communicate using wireless protocols like Fifth Generation New Radio (5GNR), Long Term Evolution (LTE), Institute of Electrical and Electronic Engineers (IEEE) 802.11 (WIFI), Low-Power Wide Area Network (LP-WAN), Code Division Multiple Access (CDMA), Frequency Division Multiple Access (FDMA), and Time Division Multiple Access (TDMA). Wireless UEs 101-102, access nodes 113, network control-plane 114, and network user-plane 115 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication network 100 as described herein.

Figure 2:
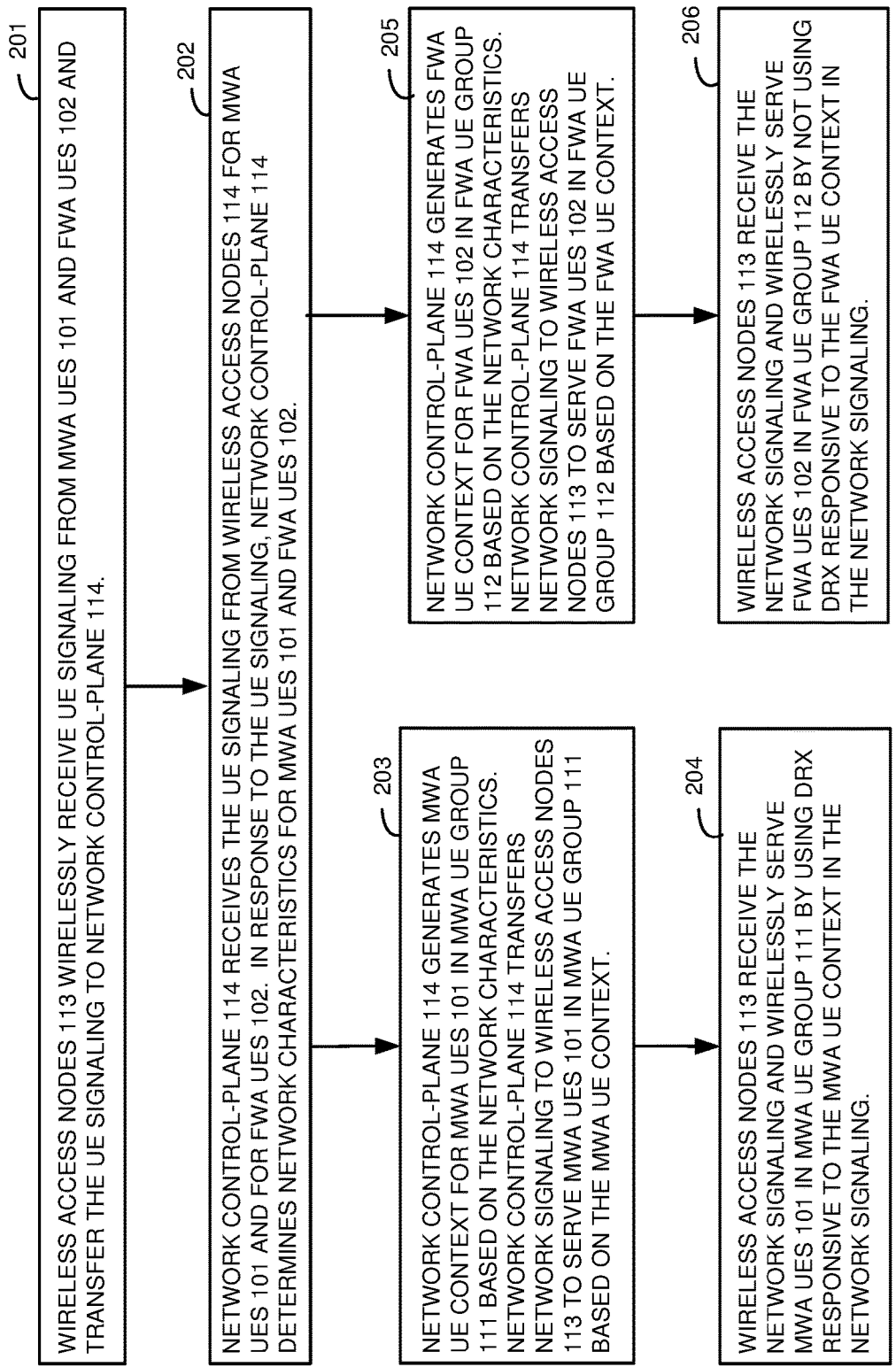
FIG. 2 illustrates an exemplary operation of the wireless communication network to serve the MWA UEs in the MWA UE group and to serve the FWA UEs in the FWA UE group.

FIG. 2 illustrates an exemplary operation of wireless communication network 100 to serve MWA UEs 101 in MWA UE group 111 and to serve FWA UEs 102 in FWA UE group 112. The operation may differ in other examples. Wireless access nodes 113 wirelessly receive UE signaling from MWA UEs 101 and FWA UEs 102 and transfer the UE signaling to network control-plane 114 (201). Network control-plane 114 receives the UE signaling from wireless access nodes 114 for MWA UEs 101 and for FWA UEs 102 (202). In response to the UE signaling, network control-plane 114 determines network characteristics for MWA UEs 101 and FWA UEs 102 (202). Network control-plane 114 generates MWA UE context for MWA UEs 101 in MWA UE group 111 based on the network characteristics (203). Network control-plane 114 transfers network signaling to wireless access nodes 113 to serve MWA UEs 101 in MWA UE group 111 based on the MWA UE context (203). Wireless access nodes 113 receive the network signaling and wirelessly serve MWA UEs 101 in MWA UE group 111 by using DRX responsive to the MWA UE context in the network signaling (204).

Contemporaneously with the operations described above in blocks 203-204, network control-plane 114 generates FWA UE context for FWA UEs 102 in FWA UE group 112 based on the network characteristics (205). Network control-plane 114 transfers network signaling to wireless access nodes 113 to serve FWA UEs 102 in FWA UE group 112 based on the FWA UE context (205). Wireless access nodes 113 receive the network signaling and wirelessly serve FWA UEs 102 in FWA UE group 112 by not using DRX responsive to the FWA UE context in the network signaling (206).

Figure 3:
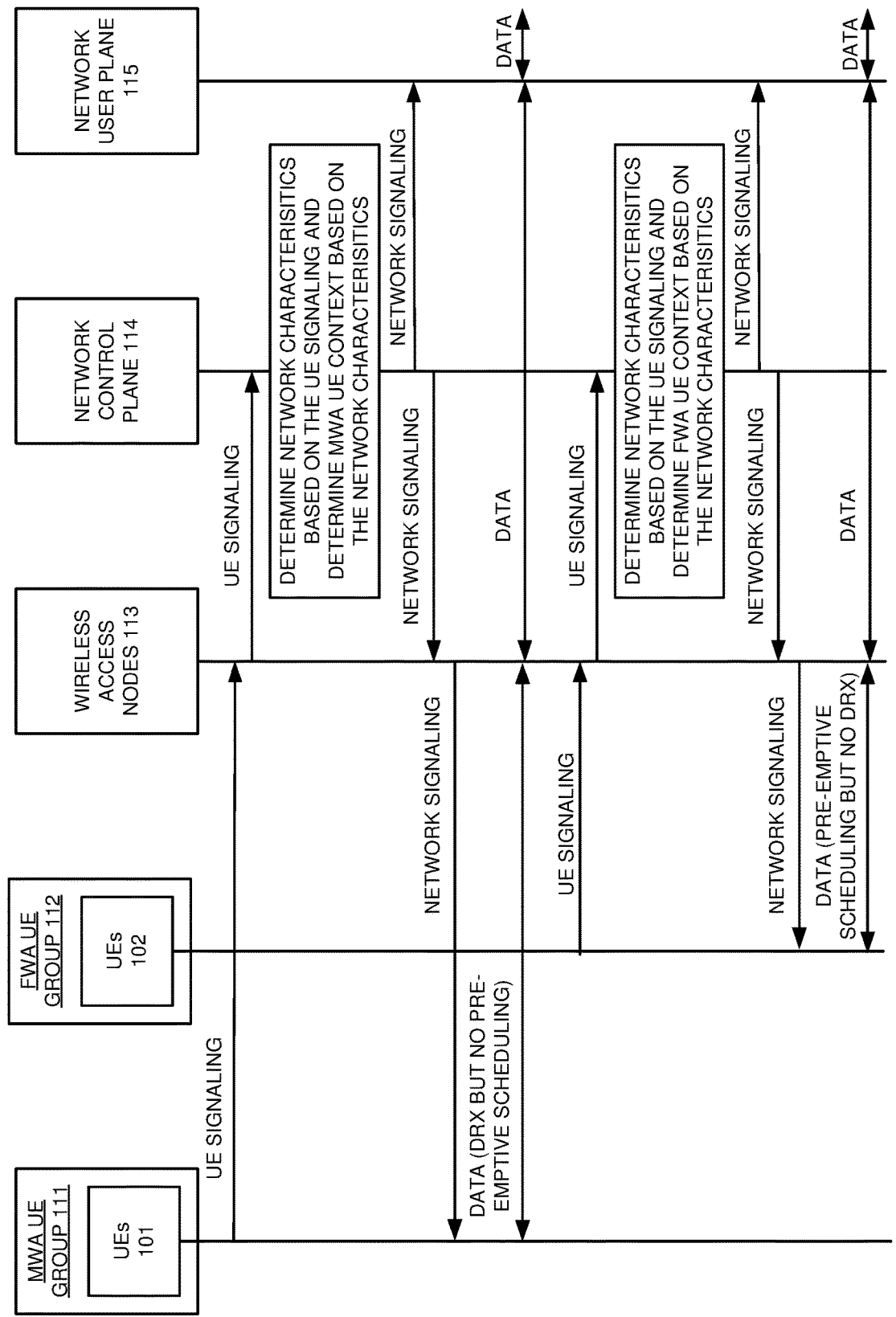
FIG. 3 illustrates an exemplary operation of the wireless communication network to serve the MWA UEs in the MWA UE group and to serve the FWA UEs in the FWA UE group.

FIG. 3 illustrates an exemplary operation of wireless communication network 100 to serve MWA UEs 101 in MWA UE group 111 and to serve FWA UEs 102 in FWA UE group 112. The operation may differ in other examples. MWA UEs 101 in MWA UE group 111 wirelessly transfer UE signaling to wireless access nodes 113. Wireless access nodes 113 wirelessly receive the UE signaling from MWA UEs 101 and transfer the UE signaling to network control-plane 114. Network control-plane 114 receives the UE signaling from wireless access nodes 114 for MWA UEs 101. In response, network control-plane 114 determines network characteristics for MWA UEs 101. Exemplary wireless network characteristics comprise network identifiers, PLMN IDs, slice information, QoS identifiers, IMEI-TACs, IMEI-SVs, SPIDs, RFSPs, and/or some other network parameters. Network control-plane 114 generates MWA UE context for MWA UEs 101 in MWA UE group 111 based on the network characteristics. The UE context comprises slice IDs, network addresses, QoS levels, DRX instructions, and the like. For example, network control-plane 114 may translate a QoS identifier for MWA UE group 111 that was received from MWA UEs 101 into MWA UE context that includes DRX schedules but not preemptive schedules. Network control-plane 114 transfers network signaling to network user plane 115 to serve MWA UEs 101 in MWA UE group 111 based on the MWA UE context. Network control-plane 114 transfers network signaling to wireless access nodes 113 to serve MWA UEs 101 in MWA UE group 111 based on the MWA UE context. Wireless access nodes 113 transfer network signaling to MWA UEs 101 to use the MWA UE context. Wireless access nodes 113 wirelessly serve MWA UEs 101 in MWA UE group 111 by exchanging user data and using DRX responsive to the MWA UE context in the network signaling. DRX allows MWA UEs 101 to sleep more when idle to conserve battery—but at the cost of increased latency. Moreover, wireless access nodes 113 wirelessly serve MWA UEs 101 in MWA UE group 111 without using pre-emptive scheduling responsive to the MWA UE context in the network signaling. The lack of pre-emptive-scheduling avoids the waste of pre-emptive grants that are never used—at the cost of increased latency.

FWA UEs 102 in FWA UE group 112 wirelessly transfer UE signaling to wireless access nodes 113. Wireless access nodes 113 wirelessly receive the UE signaling from FWA UEs 102 and transfer the UE signaling to network control-plane 114. Network control-plane 114 receives the UE signaling from wireless access nodes 113 for FWA UEs 102. In response, network control-plane determines network characteristics for FWA UEs 102. Exemplary wireless network characteristics comprise network identifiers, PLMN IDs, slice information, QoS IDs, IMEI-TACs, IMEI-SVs, SPIDs, RFSPs, and/or some other network parameters. Network control-plane 114 generates FWA UE context for FWA UEs 102 in FWA UE group 112 based on the network characteristics. The UE context comprises slice IDs, network addresses, QoS levels, pre-emptive scheduling instructions, and the like. For example, network control-plane 114 may translate IMEI-TACs for FWA UE group 112 that were received from FWA UEs 102 into FWA UE context that includes pre-emptive schedules but not DRX schedules. Network control-plane 114 transfers network signaling to wireless access nodes 113 to serve FWA UEs 102 in FWA UE group 112 based on the FWA UE context. Wireless access nodes 113 receive the network signaling and wirelessly serve FWA UEs 102 in FWA UE group 112 without using DRX responsive to the FWA UE context in the network signaling. The lack of DRX allows FWA UEs 102 to reduce latency at the cost of battery power when UEs 101 are not charging. Moreover, wireless access nodes 113 wirelessly serve FWA UEs 102 in FWA UE group 112 by using pre-emptive scheduling responsive to the FWA UE context in the network signaling. The pre-emptive scheduling allows FWA UEs 102 to further reduce latency at the cost of some wasted resources when some of these pre-emptive grants are not used.

Figure 4:
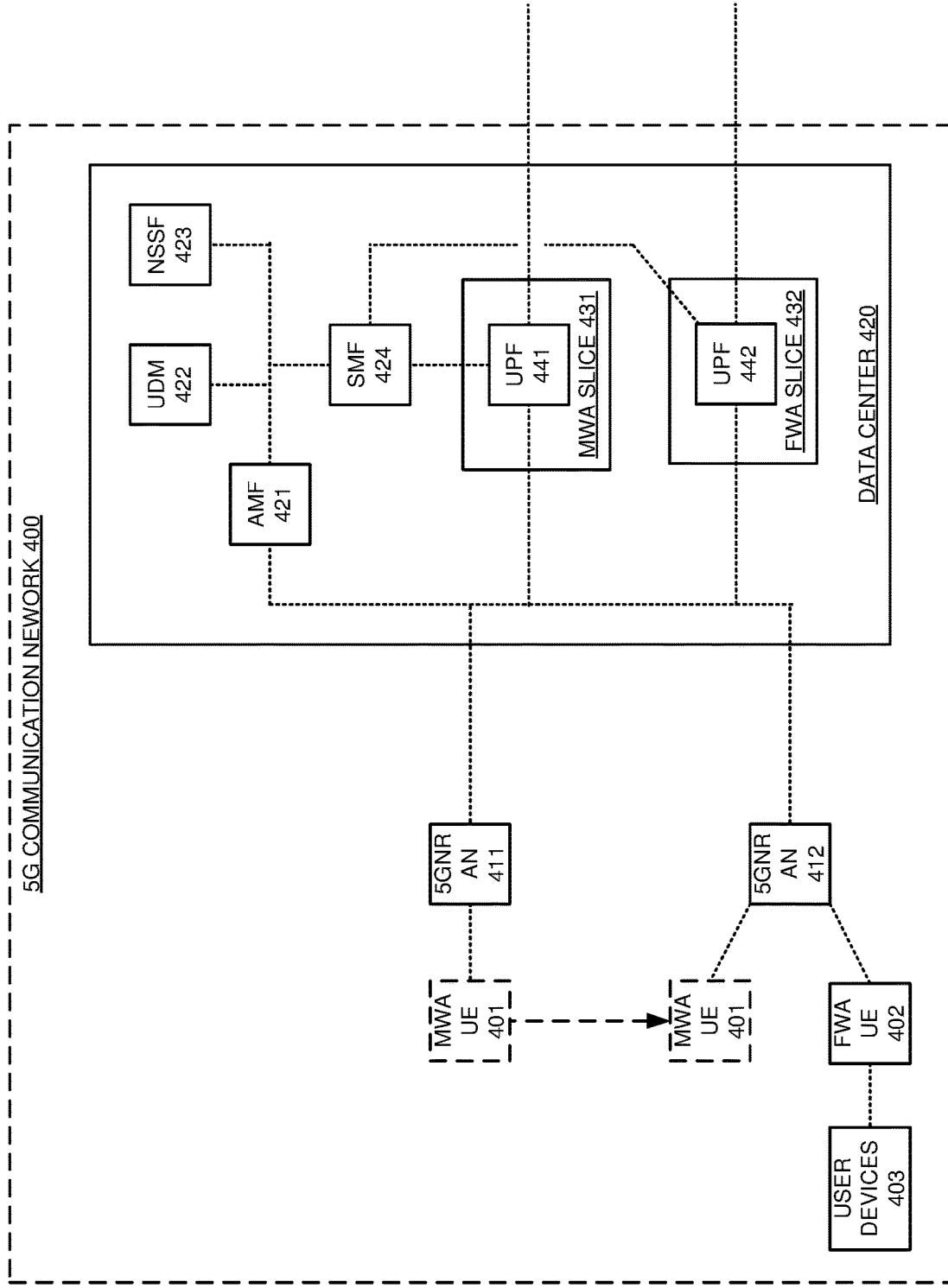
FIG. 4 illustrates an exemplary Fifth Generation (5G) communication network to serve MWA UEs in a MWA UE group and to serve FWA UEs in a FWA UE group.

FIG. 4 illustrates exemplary Fifth Generation (5G) communication network 400 to serve MWA UE 401 and FWA UE 402. 5G communication network 400 comprises an example of wireless communication network 100, although network 100 may differ. 5G communication system 400 comprises: MWA UE 401, FWA UE 402, user devices 403, 5GNR Access Nodes (ANs) 411-412, and network data center 420. Network data center 420 comprises Access and Mobility Management Function (AMF) 421, Unified Data Management (UDM) 422, Network Slice Selection Function (NSSF) 423, Session Management Function (SMF) 424, and wireless network slices 431-432. MWA network slice 431 comprises MWA User Plane Function (UPF) 441. FWA network slice 432 comprises FWA UPF 442. Network data center 420 typically includes additional network functions like Network Repository Function (NRF) that are omitted for clarity. The amount of UEs, ANs, and data centers that are shown on FIG. 4 has been restricted for clarity.

Initially, MWA UE 401 wirelessly transfers UE signaling to 5GNR AN 411. 5GNR AN 411 wirelessly receives the UE signaling from MWA UE 401 and transfers the UE signaling to AMF 421. AMF 421 receives the UE signaling from 5GNR AN 411 for MWA UE 401. In response to the UE signaling, AMF 421 interacts with UDM 422 and interacts with UE 401 over 5GNR AN 411 to authorize UE 401. AMF 421 interacts with UDM 422 to determine network characteristics for authorized MWA UE 401. The network characteristics comprise a PLMN ID, slice type, QoS ID, IMEI-TAC, IMEI-SV, Service SPID, Radio RFSP, or some other UE information. AMF 421 interacts with UDM 422, NSSF 423, and SMF 424 to develop MWA UE context for MWA UE 401 based on the network characteristics. The MWA UE context comprises data like MWA slice ID, network addresses, QoS levels, and DRX reception schedules. AMF 421 transfers MWA signaling to SMF 424 to serve MWA UE 401 per the MWA UE context. SMF 424 transfers MWA signaling to MWA UPF 441 in MWA slice 431 to serve MWA UE 401 based on the MWA UE context. AMF 421 transfers MWA signaling to 5GNR AN 411 to serve MWA UE 401 per the MWA UE context. 5GNR AN 411 transfers MWA signaling to MWA UE 401 to use the MWA UE context.

MWA UE 401 requests resource blocks from 5GNR AN 411, and 5GNR AN 411 responsively allocates and indicates resource blocks to MWA UE 401. MWA UE 401 wirelessly exchanges user data with 5GNR AN 411 over the allocated resource blocks per the MWA signaling. 5GNR AN 411 and MWA UPF 441 in MWA slice 431 exchange the user data per the MWA signaling. MWA UPF 441 in MWA slice 431 exchanges the user data with external systems per the MWA signaling.

Eventually, MWA UE 401 enters idle mode, and in response, MWA UE 401 and 5GNR AN 411 start DRX to save battery power. MWA UE 401 leaves idle mode per the DRX schedules to check for any network alerts. To handle new data, MWA UE 401 requests resource blocks from 5GNR AN 411. In response, 5GNR AN 411 transfers scheduling information to MWA UE 401 to indicate the allocated resource blocks. MWA UE 401 wirelessly exchanges user data with 5GNR AN 411 over the allocated resource blocks per the MWA signaling. 5GNR AN 411 and MWA UPF 441 in MWA slice 431 exchange the user data per the MWA signaling. MWA UPF 441 in MWA slice 431 exchanges the user data with external systems per the MWA signaling.

Subsequently, MWA UE 401 moves away from 5GNR AN 411 and toward 5GNR AN 412. 5GNR AN 411 hands-over MWA UE 401 to 5GNR AN 412 which includes a transfer of the MWA UE context from 5GNR AN 411 to 5GNR AN 412. Whether active or idle, 5GNR 412 serves MWA UE 401 in a similar manner to 5GNR AN 411 which includes the use of DRX. MWA UE 401 does not use preemptive scheduling.

Initially, FWA UE 402 wirelessly transfers UE signaling to 5GNR AN 412. 5GNR AN 412 wirelessly receives the UE signaling from FWA UE 402 and transfers the UE signaling to AMF 421. AMF 421 receives the UE signaling from 5GNR AN 412 for FWA UE 402. In response to the UE signaling, AMF 421 interacts with UDM 422 and interacts with FWA UE 402 over 5GNR AN 412 to authorize FWA UE 402. AMF 421 interacts with UDM 422 to determine network characteristics for authorized FWA UE 402. The network characteristics comprise a PLMN ID, slice information, QoS ID, IMEI-TAC, IMEI-SV, SPID, RFSP, or some other UE information. AMF 421 interacts with UDM 422, NSSF 423, and SMF 424 to develop FWA UE context for FWA UE 402 based on the network characteristics. The FWA UE context comprises data like FWA slice ID, network addresses, QoS levels, and pre-emptive resource block instructions. AMF 421 transfers FWA signaling to SMF 424 to serve FWA UE 402 per the FWA UE context. SMF 424 transfers FWA signaling to FWA UPF 442 in FWA slice 432 to serve FWA UE 402 based on the FWA UE context. AMF 421 transfers FWA signaling to 5GNR AN 412 to serve UE 402 per the FWA UE context. 5GNR AN 412 transfers FWA signaling to FWA UE 402 to use the FWA UE context.

5GNR AN 411 automatically allocates resource blocks to FWA UE 402 per the preemptive scheduling instructions. FWA UE 402 exchanges data with user devices 403. FWA UE 402 wirelessly exchanges the user data with 5GNR AN 412 over the automatically-allocated resource blocks per the FWA signaling. 5GNR AN 412 and FWA UPF 442 in FWA slice 432 exchange the user data per the FWA signaling. FWA UPF 442 in FWA slice 432 exchanges the user data with external systems per the FWA signaling.

FWA UE 402 does not use DRX unless it experiences a power loss of more than minimal duration. When FWA UE 402 detects a significant consumption of battery power, FWA UE 402 requests DRX from 5GNR AN 412. When FWA UE 402 enters idle mode, FWA UE 402 and 5GNR AN 412 start DRX to save battery power. FWA UE 401 leaves idle per the DRX schedule to check for network alerts. To handle new data, 5GNR AN 412 automatically allocates resource blocks to FWA UE 402 per the preemptive scheduling instructions. FWA UE 402 wirelessly exchanges data with 5GNR AN 412 over the automatically-allocated resource blocks per the FWA signaling. 5GNR AN 412 and FWA UPF 442 in FWA slice 432 exchange the user data per the FWA signaling. FWA UPF 442 in FWA slice 432 exchange the data with external systems per the FWA signaling. When FWA UE 402 detects the normal power supply has returned, FWA UE 402 requests an end to DRX from 5GNR AN 412, and the operation returns to normal with no DRX.

Figure 5:
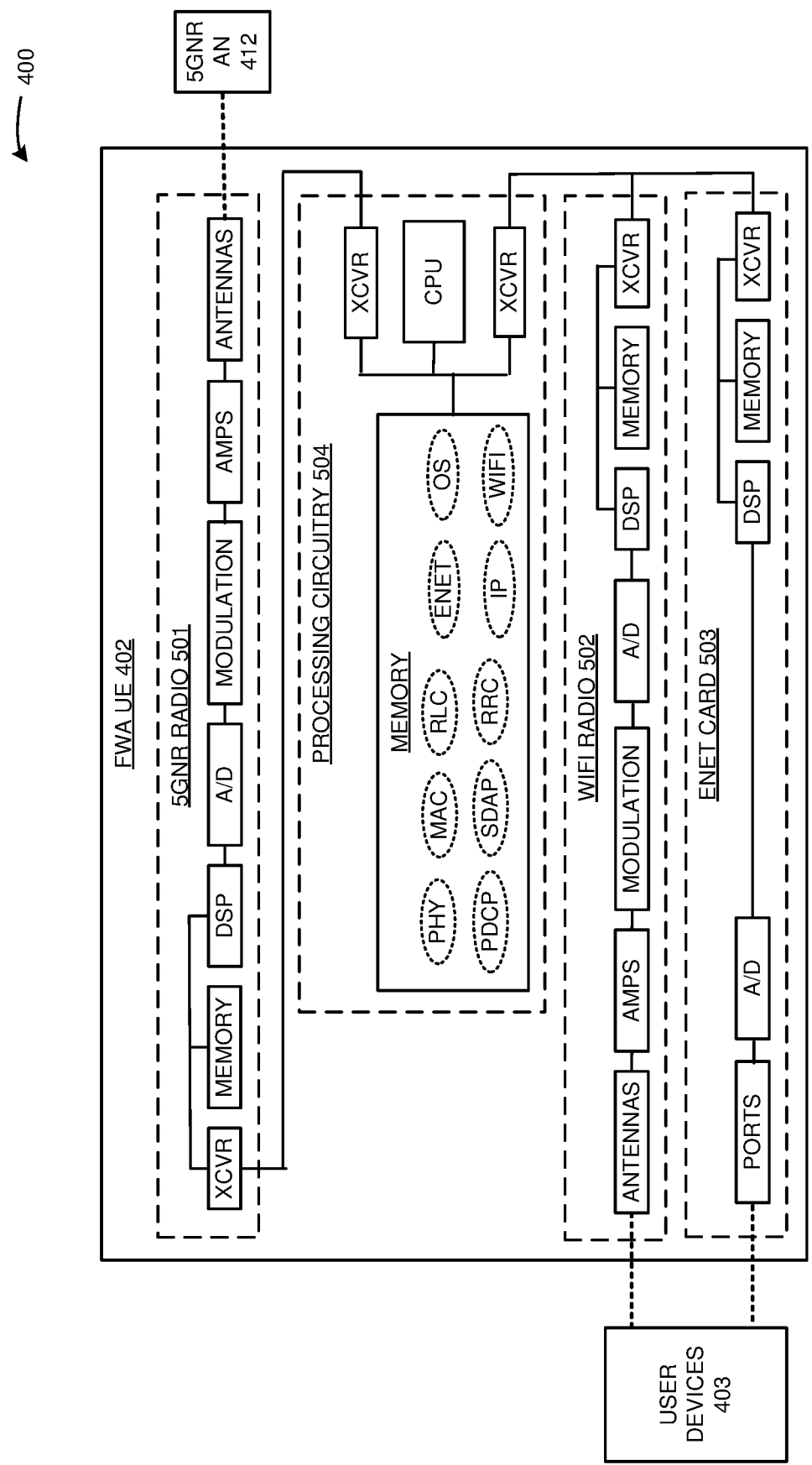
FIG. 5 illustrates an exemplary UE in the 5G communication network.

FIG. 5 illustrates exemplary FWA UE 402 in 5G communication network 400. FWA UE 402 comprises an example of UEs 101-102 and 401, although UES 101-102 and 401 may differ. FWA UE 402 comprises 5GNR radio 501, WIFI radio 502, Ethernet (ENET) card, 503, and processing circuitry 504. Radios 501-502 comprise antennas, amplifiers, filters, modulation, analog-to-digital interfaces, DSP, memory, and transceivers that are coupled over bus circuitry. ENET card 503 comprises ports, analog-to-digital interfaces, DSP, memory, and transceivers that are coupled over bus circuitry. Processing circuitry 504 comprises CPU, memory, and transceivers (XCVRs) that are coupled over bus circuitry. The memory in processing circuitry 504 stores software for Physical Layer (PHY), Media Access Control (MAC), Radio Link Control (RLC), Packet Data Convergence Protocol (PDCP), Service Data Adaption Protocol (SDAP), Radio Resource Control (RRC), ENET, WIFI, Internet Protocol (IP), and Operating System (OS). The antennas in 5GNR radio 501 exchanges 5GNR signals with 5GNR AN 412. The antennas in WIFI radios 502 exchange WIFI signals with user devices 403. The ports in ENET card 503 exchange ENET signals with user devices 403. The transceivers in radios 501-502 and card 503 are coupled to transceivers in processing circuitry 504. In processing circuitry 504, the CPU retrieves the software from the memory and executes the software to direct the operation of FWA UE 402 as described herein.

Figure 6:
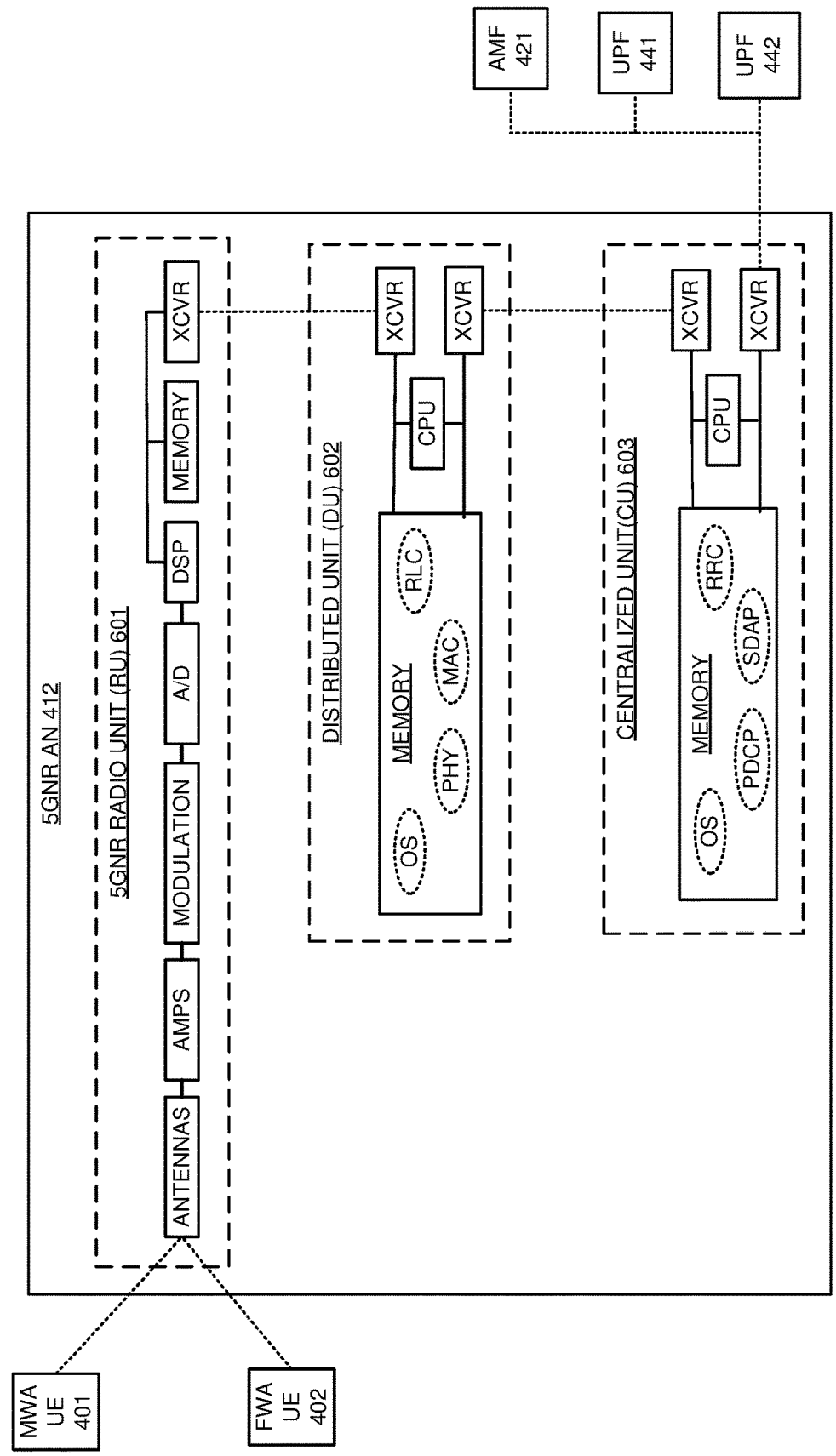
FIG. 6 illustrates an exemplary 5G New Radio Access Node (5GNR AN) in the 5G communication network.

FIG. 6 illustrates exemplary 5G New Radio Access Node (5GNR AN) 412 in 5G communication network 400. 5GNR AN 412 comprises and example of wireless access nodes 113 and 411, although access nodes 113 and 411 may differ. 5GNR AN 412 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for PHY, MAC, and RLC. CU 603 comprises memory, CPU, and transceivers that are coupled over bus circuitry. The memory in CU 603 stores an operating system and 5GNR network applications for PDCP, SDAP, and RRC. The antennas in 5GNR RU 601 are wirelessly coupled to wireless UE 401 over a 5GNR link. Transceivers in 5GNR RU 601 are coupled to transceivers in DU 602. Transceivers in DU 602 are coupled to transceivers in CU 603. Transceivers in CU 603 are coupled AMF 421 and UPFs 441-442. The DSP and CPU in RU 601, DU 602, and CU 603 execute the radio applications, operating systems, and network applications to exchange data and signaling with UEs 401-402, AMF 421, and UPFs 441-442 as described herein.

Figure 7:
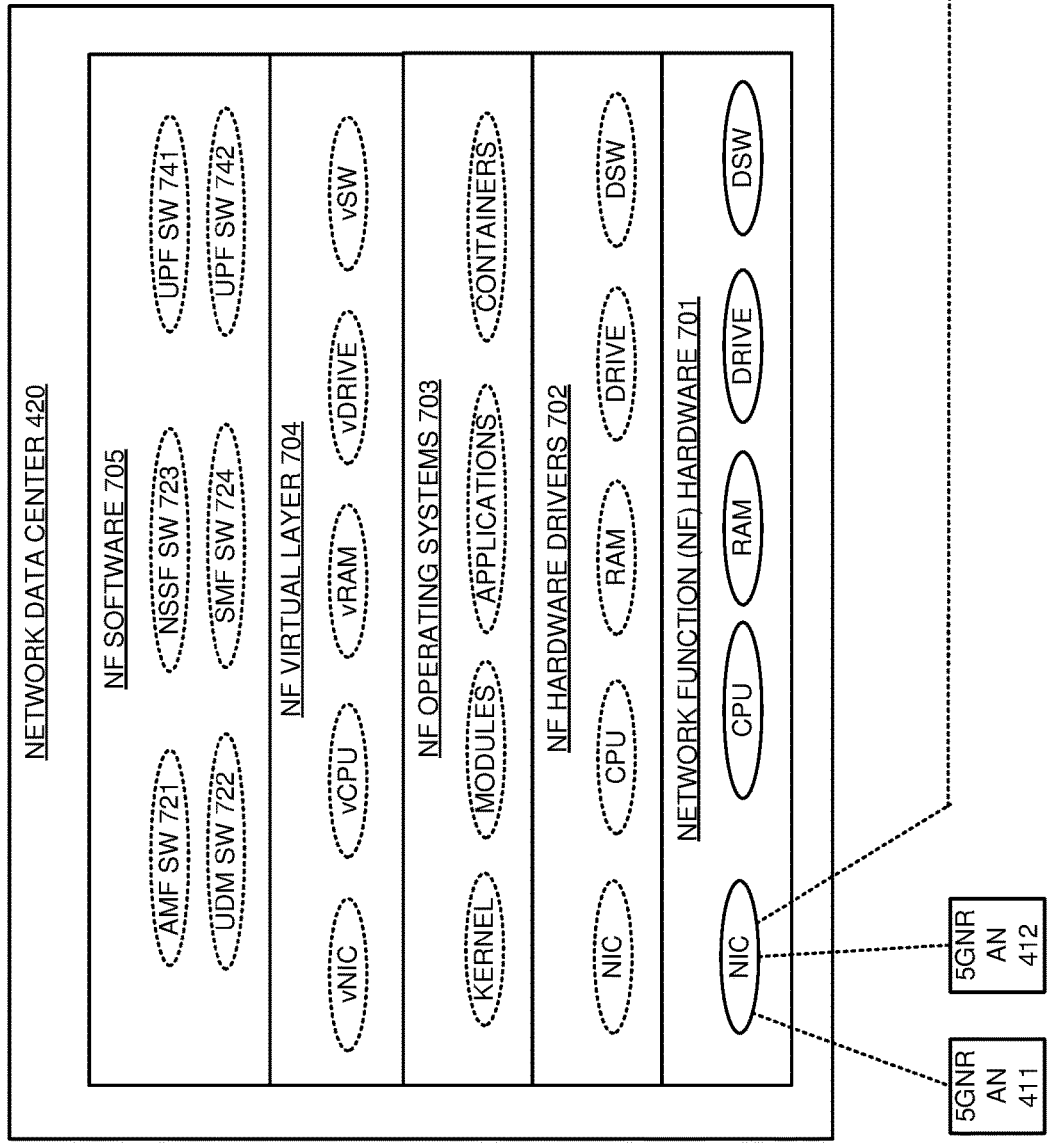
FIG. 7 illustrates an exemplary data center in the 5G communication network.

FIG. 7 illustrates exemplary data center 420 in 5G communication system 400. Network data center 420 comprises an example of network control-plane 114 and network user plane 115, although planes 114-115 may differ. Network data center 420 comprises Network Function (NF) hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, and applications that form containers for virtual layer and NF software execution. NF virtual layer 704 comprises vNIC, vCPU, vRAM, vDRIVE, and vSW. NF SW 705 comprises AMF SW 721, UDM SW 722, NSSF SW 723, SMF SW 724, UPF SW 741, and UPF SW 742. Other NF SW like Network Repository Function (NRF) SW is typically present but is omitted for clarity. Network data center 420 may be located at a single site or be distributed across multiple geographic locations. The NIC in NF hardware 701 are coupled to 5GNR ANs 411-412 and external systems. NF hardware 701 executes NF hardware drivers 702, NF operating systems 703, NF virtual layer 704, and NF SW 705 to form and operate AMF 421, UDM 422, NSSF 423, SMF 424, UPF 441, and UPF 442 as described herein.

Figure 8:
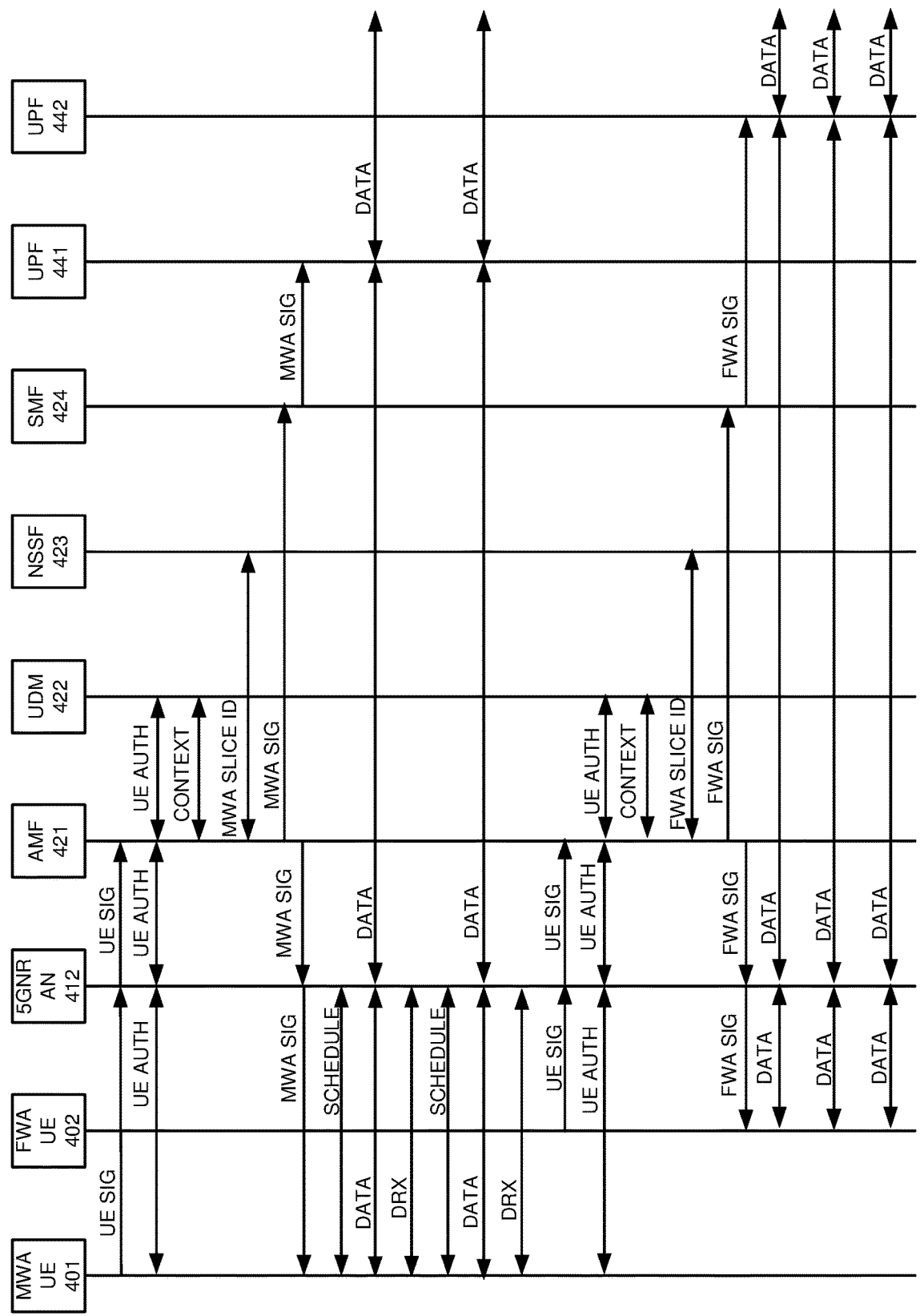
FIG. 8 illustrates an exemplary operation of the 5G communication network to serve the MWA UEs in the MWA UE group and to serve the FWA UEs in the FWA UE group.

FIG. 8 illustrates an exemplary operation of 5G communication network 400 to serve MWA UE 401 and FWA UE 402. The operation may differ in other examples. MWA UE 401 wirelessly transfers UE signaling to 5GNR AN 412. 5GNR AN 412 wirelessly receives the UE signaling from MWA UE 401 and transfers the UE signaling to AMF 421. AMF 421 receives the UE signaling from 5GNR AN 412 for MWA UE 401. In response to the UE signaling, AMF 421 interacts with UDM 422 and interacts with MWA UE 401 over 5GNR AN 412 to authorize MWA UE 401. AMF 421 interacts with UDM 422 to determine network characteristics for authorized MWA UE 401. The network characteristics comprise data like PLMN ID, slice type, QoS ID, IMEI-TAC, IMEI-SV, SPID, and RFSP. AMF 421 interacts with UDM 422 to determine MWA UE context for MWA UE 401 based on the network characteristics for MWA UE 401. AMF 421 interacts with NSSF 423 to determine an MWA slice ID for MWA UE 401 based on the network characteristics. The MWA UE context includes an MWA slice ID, network addresses, QoS levels, and DRX instructions. AMF 421 transfers MWA signaling (MWA SIG) to SMF 424 to serve UE 401 per the MWA UE context. SMF 424 transfers MWA signaling to MWA UPF 441 to serve MWA UE 401 based on the MWA UE context. AMF 421 transfers MWA signaling to 5GNR AN 412 to serve MWA UE 401 per the MWA UE context. 5GNR AN 412 transfers MWA signaling to MWA UE 401 to use the MWA UE context. MWA UE 401 requests resource scheduling from 5GNR AN 412. 5GNR AN 412 allocates and indicates a resource block schedule to MWA UE 401. MWA UE 401 wirelessly exchanges user data with 5GNR AN 412 over the allocated resource blocks per the MWA signaling. 5GNR AN 412 and MWA UPF 441 exchange the user data per the MWA signaling. MWA UPF 441 exchanges the user data with external systems per the MWA signaling.

Eventually, MWA UE 401 enters idle mode, and in response, UE 401 and 5GNR AN 412 start DRX to save battery power. MWA UE 401 leaves idle mode per the DRX instructions to check for network alerts. To handle new data, MWA UE 401 requests new resource blocks from 5GNR AN 412. 5GNR AN 412 allocates and indicates the resource blocks to MWA UE 401. MWA UE 401 wirelessly exchanges user data with 5GNR AN 412 over the allocated resource blocks per the MWA signaling. 5GNR AN 412 and MWA UPF 441 exchange the user data per the MWA signaling. MWA UPF 441 exchanges the user data with external systems per the MWA signaling. Eventually, MWA UE 401 re-enters idle mode, and in response, UE 401 and 5GNR AN 412 restart DRX to save battery power. MWA UE 401 does not use preemptive scheduling.

FWA UE 402 wirelessly transfers UE signaling to 5GNR AN 412. 5GNR AN 412 wirelessly receives the UE signaling from FWA UE 402 and transfers the UE signaling to AMF 421. AMF 421 receives the UE signaling from 5GNR AN 412 for FWA UE 402. In response to the UE signaling, AMF 421 interacts with UDM 422 and interacts with FWA UE 402 over 5GNR AN 412 to authorize FWA UE 402. AMF 421 interacts with UDM 422 to determine network characteristics for authorized FWA UE 402. The network characteristics comprise data like PLMN ID, slice type, QoS ID, IMEI-TAC, IMEI-SV, SPID, and RFSP. AMF 421 interacts with UDM 422 to determine FWA UE context for FWA UE 402 based on the network characteristics for FWA UE 402. The FWA context comprises FWA slice ID, network addresses, QoS levels, and preemptive scheduling instructions. AMF 421 interacts with NSSF 423 to develop the FWA slice ID for FWA UE 402 based on the network characteristics. AMF 421 transfers FWA signaling (FWA SIG) to SMF 424 to serve FWA UE 402 per the FWA UE context. SMF 424 transfers FWA signaling to FWA UPF 442 to serve FWA UE 402 based on the FWA UE context. AMF 421 transfers FWA signaling to 5GNR AN 412 to serve FWA UE 402 per the FWA UE context. 5GNR AN 412 transfers FWA signaling to FWA UE 402 to use the FWA UE context. 5GNR AN 412 automatically allocates and indicates resource blocks to FWA UE 402 per the preemptive scheduling instructions. FWA UE 402 wirelessly exchanges user data with 5GNR AN 412 over the automatically-allocated resource blocks per the FWA signaling. 5GNR AN 412 and FWA UPF 442 exchange the user data per the FWA signaling. FWA UPF 442 exchanges the user data with external systems per the FWA signaling.

The wireless data network circuitry described above comprises computer hardware and software that form special-purpose wireless network circuitry to serve MWA UEs and FWA UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to serve MWA UEs and FWA UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UEs) that comprise a Fixed Wireless Access (FWA) UE group and a Mobile Wireless Access (MWA) UE group, the method comprising:
   wirelessly receiving UE signaling from the UEs;
   determining network characteristics for the UEs;
   generating MWA UE context for the UEs in the MWA UE group based on the network characteristics and generating FWA UE context for the UEs in the FWA UE group based on the network characteristics;
   transferring network signaling to serve the UEs in the MWA UE group based on the MWA UE context and to serve the UEs in the FWA UE group based on the FWA UE context; and
   wirelessly serving the UEs in the MWA UE group by using Discontinuous Reception (DRX) responsive to the MWA UE context in the network signaling, and wirelessly serving the UEs in the FWA group without using the DRX responsive to the FWA UE context in the network signaling.

2. A method of operating a wireless communication network to serve User Equipment (UEs) that comprise a Fixed Wireless Access (FWA) UE group and a Mobile Wireless Access (MWA) UE group, the method comprising:
   wirelessly receiving, by wireless access nodes, UE signaling from the UEs and transferring the UE signaling to a network control-plane;
   receiving, by the network control-plane, the UE signaling from the wireless access nodes and responsively determining network characteristics for the UEs;
   generating, by the network control-plane, MWA UE context for the UEs in the MWA UE group based on the network characteristics and generating FWA UE context for the UEs in the FWA UE group based on the network characteristics;
   transferring, by the network control-plane, network signaling to the wireless access nodes to serve the UEs in the MWA UE group based on the MWA UE context and to serve the UEs in the FWA UE group based on the FWA UE context; and
   receiving, by the wireless access nodes, the network signaling, wirelessly serving the UEs in the MWA UE group by using Discontinuous Reception (DRX) responsive to the MWA UE context in the network signaling, and wirelessly serving the UEs in the FWA group without using the DRX responsive to the FWA UE context in the network signaling.

3. The method of claim 2 further comprising:
   wirelessly serving, by the wireless access nodes, the UEs in the FWA UE group by using pre-emptive resource block scheduling responsive to the FWA UE context in the network signaling, and wirelessly serving, by the wireless access nodes, the UEs in the MWA group without using the pre-emptive resource block scheduling responsive to the MWA UE context in the network signaling.

4. The method of claim 2 wherein:
   determining, by the network control plane, the network characteristics for the UEs comprises determining wireless network identifiers;
   generating, by the network control plane, the MWA UE context for the UEs in the MWA UE group based on the network characteristics comprises generating the MWA UE context for the UEs in the MWA UE group responsive to MWA ones of the wireless network identifiers; and
   generating, by the network control plane, the FWA UE context for the UEs in the FWA UE group based on the network characteristics comprises generating the FWA UE context for the UEs in the FWA UE group responsive to FWA ones of the wireless network identifiers.

5. The method of claim 2 wherein:
   determining, by the network control plane, the network characteristics for the UEs comprises determining wireless network Public Land Mobile Network Identifiers (PLMN IDs);
   generating, by the network control plane, the MWA UE context for the UEs in the MWA UE group based on the network characteristics comprises generating the MWA UE context for the UEs in the MWA UE group responsive to MWA ones of the wireless network PLMN IDs; and
   generating, by the network control plane, the FWA UE context for the UEs in the FWA UE group based on the network characteristics comprises generating the FWA UE context for the UEs in the FWA UE group responsive to FWA ones of the wireless network PLMNs.

6. The method of claim 2 wherein:
   determining, by the network control plane, the network characteristics for the UEs comprises determining wireless network slice types; the network control-plane generating the MWA UE context for the UEs in the MWA UE group based on the network characteristics comprises generating the MWA UE context for the UEs in the MWA UE group responsive to MWA ones of the wireless network slice types; and generating, by the network control plane, the FWA UE context for the UEs in the FWA UE group based on the network characteristics comprises generating the FWA UE context for the UEs in the FWA UE group responsive to FWA ones of the wireless network slice types.

7. The method of claim 2 wherein:
determining, by the network control plane, the network characteristics for the UEs comprises determining wireless network Quality-of-Service (QOS) identifiers;
generating, by the network control plane, the MWA UE context for the UEs in the MWA UE group based on the network characteristics comprises generating the MWA UE context for the UEs in the MWA UE group responsive to MWA ones of the wireless network QoS identifiers; and
generating, by the network control plane, the FWA UE context for the UEs in the FWA UE group based on the network characteristics comprises generating the FWA UE context for the UEs in the FWA UE group responsive to FWA ones of the wireless network QoS identifiers.

8. The method of claim 2 wherein:
determining, by the network control plane, the network characteristics for the UEs comprises determining wireless network International Mobile Equipment Identifier Type Allocation Codes (IMEI-TACs);
generating, by the network control plane, the MWA UE context for the UEs in the MWA UE group based on the network characteristics comprises generating the MWA UE context for the UEs in the MWA UE group responsive to MWA ones of the wireless network IMEI-TACs; and
generating, by the network control plane, the FWA UE context for the UEs in the FWA UE group based on the network characteristics comprises generating the FWA UE context for the UEs in the FWA UE group responsive to FWA ones of the wireless network IMEI-TACs.

9. The method of claim 2 wherein:
determining, by the network control plane, the network characteristics for the UEs comprises determining wireless network Service Profile Identifiers (SPIDs);
generating, by the network control plane, the MWA UE context for the UEs in the MWA UE group based on the network characteristics comprises generating the MWA UE context for the UEs in the MWA UE group responsive to MWA ones of the wireless network SPIDs; and
generating, by the network control plane, the FWA UE context for the UEs in the FWA UE group based on the network characteristics comprises generating the FWA UE context for the UEs in the FWA UE group responsive to FWA ones of the wireless network SPIDs.

10. The method of claim 2 wherein:
determining, by the network control plane, the network characteristics for the UEs comprises determining wireless network Radio Frequency Selection Priorities (RFSPs);
generating, by the network control plane, the MWA UE context for the UEs in the MWA UE group based on the network characteristics comprises generating the MWA UE context for the UEs in the MWA UE group responsive to MWA ones of the wireless network RFSPs; and
generating, by the network control plane, the FWA UE context for the UEs in the FWA UE group based on the network characteristics comprises generating the FWA UE context for the UEs in the FWA UE group responsive to FWA ones of the wireless network RFSPs.

11. The method of claim 2 further comprising:
wirelessly receiving, by one or more of the wireless access nodes, DRX requests from one or more of the UEs in the FWA UE group; and the one or more of the wireless access nodes wirelessly serving the one or more of the UEs in the FWA group by using the DRX responsive to the FWA UE context and the DRX requests.

12. A wireless communication network to serve User Equipment (UEs) that comprise a Fixed Wireless Access (FWA) UE group and a Mobile Wireless Access (MWA) UE group, the wireless communication network comprising:
wireless access nodes configured to wirelessly receive UE signaling from the UEs and transfer the UE signaling to a network control-plane;
the network control-plane configured to receive the UE signaling from the wireless access nodes and responsively determine network characteristics for the UEs;
the network control-plane configured to generate MWA UE context for the UEs in the MWA UE group based on the network characteristics and generate FWA UE context for the UEs in the FWA UE group based on the network characteristics;
the network control-plane configured to transfer network signaling to the wireless access nodes to serve the UEs in the MWA UE group based on the MWA UE context and to serve the UEs in the FWA UE group based on the FWA UE context; and
the wireless access nodes configured to receive the network signaling, wirelessly serve the UEs in the MWA UE group by using Discontinuous Reception (DRX) responsive to the MWA UE context in the network signaling, and wirelessly serve the UEs in the FWA group without using the DRX responsive to the FWA UE context in the network signaling.

13. The wireless communication network of claim 12 further comprising:
the wireless access nodes configured to wirelessly serve the UEs in the FWA UE group by using pre-emptive resource block scheduling responsive to the FWA UE context in the network signaling, and
the wireless access nodes configured to wirelessly serve the UEs in the MWA group without using the pre-emptive resource block scheduling responsive to the MWA UE context in the network signaling.

14. The wireless communication network of claim 12 wherein:
the network control-plane is configured to determine wireless network identifiers to determine the network characteristics for the UEs;
the network control-plane is configured to generate the MWA UE context for the UEs in the MWA UE group responsive to MWA ones of the wireless network identifiers to generate the MWA UE context for the UEs in the MWA UE group based on the network characteristics; and
the network control-plane is configured to generate the FWA UE context for the UEs in the FWA UE group responsive to FWA ones of the wireless network identifiers to generate the FWA UE context for the UEs in the FWA UE group based on the network characteristics.

15. The wireless communication network of claim 12 wherein:
the network control-plane is configured to determine wireless network Public Land Mobile Network Identifiers (PLMN IDs) to determine the network characteristics for the UEs;

the network control-plane is configured to generate the MWA UE context for the UEs in the MWA UE group responsive to MWA ones of the wireless network PLMN IDs to generate the MWA UE context for the UEs in the MWA UE group based on the network characteristics; and the network control-plane is configured to generate the FWA UE context for the UEs in the FWA UE group responsive to FWA ones of the wireless network PLMNs to generate the FWA UE context for the UEs in the FWA UE group based on the network characteristics.

16. The wireless communication network of claim 12 wherein:

the network control-plane is configured to determine wireless network slice types to determine the network characteristics for the UEs;

the network control-plane is configured to generate the MWA UE context for the UEs in the MWA UE group responsive to MWA ones of the wireless network slice types to generate the MWA UE context for the UEs in the MWA UE group based on the network characteristics; and the network control-plane is configured to generate the FWA UE context for the UEs in the FWA UE group responsive to FWA ones of the wireless network slice types to generate the FWA UE context for the UEs in the FWA UE group based on the network characteristics.

17. The wireless communication network of claim 12 wherein:

the network control-plane is configured to determine wireless network Quality-of-Service (QoS) identifiers to determine the network characteristics for the UEs;

the network control-plane is configured to generate the MWA UE context for the UEs in the MWA UE group responsive to MWA ones of the wireless network QoS identifiers to generate the MWA UE context for the UEs in the MWA UE group based on the network characteristics; and the network control-plane is configured to generate the FWA UE context for the UEs in the FWA UE group responsive to FWA ones of the wireless network QoS identifiers to generate the FWA UE context for the UEs in the FWA UE group based on the network characteristics.

18. The wireless communication network of claim 12 wherein:

the network control-plane comprises is configured to determine wireless network International Mobile Equipment Identifier Type Allocation Codes (IMEI-TACs) to determine the network characteristics for the UEs;

the network control-plane is configured to generate the MWA UE context for the UEs in the MWA UE group responsive to MWA ones of the wireless network IMEI-TACs to generate the MWA UE context for the UEs in the MWA UE group based on the network characteristics; and the network control-plane is configured to generate the FWA UE context for the UEs in the FWA UE group responsive to FWA ones of the wireless network IMEI-TACs to generate the FWA UE context for the UEs in the FWA UE group based on the network characteristics.

19. The wireless communication network of claim 12 wherein:

the network control-plane is configured to determine wireless network Service Profile Identifiers (SPIDs) to determine the network characteristics for the UEs;

the network control-plane is configured to generate the MWA UE context for the UEs in the MWA UE group responsive to MWA ones of the wireless network SPIDs to generate the MWA UE context for the UEs in the MWA UE group based on the network characteristics; and the network control-plane is configured to generate the FWA UE context for the UEs in the FWA UE group responsive to FWA ones of the wireless network SPIDs to generate the FWA UE context for the UEs in the FWA UE group based on the network characteristics.

20. The wireless communication network of claim 12 wherein:

the network control-plane is configured to determine wireless network Radio Frequency Selection Priorities (RFSPs) to determine the network characteristics for the UEs;

the network control-plane is configured to generate the MWA UE context for the UEs in the MWA UE group responsive to MWA ones of the wireless network RFSPs to generate the MWA UE context for the UEs in the MWA UE group based on the network characteristics; and the network control-plane is configured to generate the FWA UE context for the UEs in the FWA UE group responsive to FWA ones of the wireless network RFSPs to generate the FWA UE context for the UEs in the FWA UE group based on the network characteristics.

* * * * *